(12) United States Patent
Yamada et al.

(10) Patent No.: US 8,091,851 B2
(45) Date of Patent: Jan. 10, 2012

(54) SLIDE DEVICE FOR VEHICLE

(75) Inventors: Yukifumi Yamada, Toyota (JP); Naoki Goto, Tokai (JP); Shinya Isobe, Nagoya (JP); Hiroyuki Okazaki, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/999,202

(22) PCT Filed: Aug. 24, 2009

(86) PCT No.: PCT/JP2009/064691
§ 371 (c)(1),
(2), (4) Date: Dec. 15, 2010

(87) PCT Pub. No.: WO2010/024210
PCT Pub. Date: Mar. 4, 2010

(65) Prior Publication Data
US 2011/0089306 A1 Apr. 21, 2011

(30) Foreign Application Priority Data
Aug. 27, 2008 (JP) ................................. 2008-218213

(51) Int. Cl.
*B60N 2/07* (2006.01)
*F16C 29/06* (2006.01)
(52) U.S. Cl. ........................... 248/430; 248/429; 384/43
(58) Field of Classification Search .................. 248/430, 248/429, 420, 424, 298.1; 384/43; 296/65.13–65.14; 297/344.1–344.11
See application file for complete search history.

(56) References Cited

U.S. PATENT DOCUMENTS

| 4,582,371 A | | 4/1986 | Mottate | |
|---|---|---|---|---|
| 4,632,573 A | * | 12/1986 | Itoh | 384/43 |
| 4,795,272 A | | 1/1989 | Mottate | |
| 5,123,754 A | * | 6/1992 | Tanaka | 384/45 |

(Continued)

FOREIGN PATENT DOCUMENTS
GB 2 437 911 A 11/2007
(Continued)

OTHER PUBLICATIONS
International Search Report issued Oct. 13, 2009 in PCT/JP09/064691 filed Aug. 24, 2009.
(Continued)

*Primary Examiner* — Terrell McKinnon
*Assistant Examiner* — Ingrid M Weinhold
(74) *Attorney, Agent, or Firm* — Oblon, Spivak, McClelland, Maier & Neustadt, L.L.P.

(57) ABSTRACT

A vehicle slide device is provided, which can adjustably move the second rail along the first rail without play therebetween in a front-rearward direction with a long adjustment stroke. In the vehicle slide device according to the invention, since a plurality of rolling elements annularly arranged in the attaching portion formed at the second rail are always in contact with the operating surface of the attaching portion and the operating surface of the first rail when the second rail moves relative to the first rail in a front-rearward directions, the play of the second rail relative to the first rail in up-down and right-left directions can be eliminated. Further, since the plurality of rolling elements roll and circulate at the attaching portion, the second rail can smoothly move in a front-rearward direction along the first rail.

9 Claims, 13 Drawing Sheets

U.S. PATENT DOCUMENTS

| | | | |
|---|---|---|---|
| 6,561,056 B2* | 5/2003 | Maffeis | 74/490.01 |
| 7,008,107 B2* | 3/2006 | Kuwabara | 384/45 |
| 7,229,212 B2* | 6/2007 | Takeuchi | 384/45 |
| 7,320,546 B2* | 1/2008 | Teramachi | 384/45 |
| 7,543,991 B2* | 6/2009 | Maffeis | 384/45 |
| 7,600,918 B2* | 10/2009 | Shirai et al. | 384/45 |
| 7,862,236 B2* | 1/2011 | Chen | 384/45 |
| 2003/0164054 A1* | 9/2003 | Kuo et al. | 74/89.33 |
| 2004/0076348 A1* | 4/2004 | Dalessandro et al. | 384/43 |
| 2004/0232299 A1* | 11/2004 | Kato et al. | 248/298.1 |
| 2007/0090263 A1 | 4/2007 | Yamada et al. | |
| 2008/0048087 A1 | 2/2008 | Kojima et al. | |

FOREIGN PATENT DOCUMENTS

| | | |
|---|---|---|
| JP | 09 071157 | 3/1997 |
| JP | 2007 112370 | 5/2007 |
| JP | 2008 049891 | 3/2008 |

OTHER PUBLICATIONS

Extended Search Report issued Jul. 19, 2011 in European Patent Application No. 09809861.9-2424/2316688.

* cited by examiner

SLIDE DEVICE FOR VEHICLE

TECHNOLOGICAL FIELD

This invention relates to a slide device for a vehicle provided with a pair of first rails fixed to the vehicle and a pair of second rails supported on the pair of first rails and movable relative thereto, and more particularly, a slide device for a vehicle which can move a vehicle seat in a front-rearward direction of the vehicle.

BACKGROUND ART

Conventionally, a seat slide device for a vehicle described in the Patent Document 1 has been known. This seat slide device for a vehicle includes a lower rail fixed to a floor side of the vehicle and an upper rail slidably engaged with the lower rail and on which a seat of the vehicle is to be attached. This upper rail is formed by a plate shaped first upper rail and a plate shaped second upper rail layered on the first upper rail and a bracket is disposed between the first and the second upper rails, which rotatably supports a metal-made roller which rolls relative to the lower rail. By this structure, the upper rail can be smoothly movable along the lower rail in a front-rearward direction and accordingly, the upper rail can be formed with the length minimum to support the vehicle seat thereon and the lower rail can be formed with the length maximum to be provided to the vehicle floor. Thus, a seat slide device for a vehicle can be realized, which is movable for adjustment with a long adjusting stroke.

THE DOCUMENT OF CONVENTIONAL TECHNOLOGY

Patent Document

Patent Document 1: JP 9 (1997)-71157 (paragraphs [0014] and [0029] and FIG.6)

DISCLOSURE OF THE INVENTION

Problems to be Solved by the Invention

However, in the conventional seat slide device for a vehicle as described above, when the roller is rotatably fixed to one of the upper and lower rails and thus fixed roller is formed to roll on the other of the upper and lower rails, play may be easily generated between the both rails due to an assembling error of roller relative to the one of the rails and/or size errors of both rails. To obviate this problem, a resin-made slider is provided at the upright surface formed at the upper rail and extending in parallel to the side surface of the lower rail to be in slidable contact with the inner wall surface of the lower rail. This can prevent the upper rail from generation of play in up-down and right-left directions relative to the lower rail. However, according to this structure, since this slider is always in contact with the inner wall surface of the lower rail, a smooth front-rearward movement may be interrupted by a sliding resistance generated at the upper contact portion when the upper rail is moved in a front-rearward direction along the lower rail. Although this sliding resistance can be eliminated by providing between the upper and lower rails rollers which contact therewith in both up-down and right-left directions, the device itself becomes extensively large thereby to lead to the cost-up and large-size structure. Further, when the errors in size occur at both rails, smooth front-rearward movement of the upper rail relative to the lower rail is interfered because the metal-made rollers cannot absorb the size errors.

The present invention was made in consideration with the above problems and the object of the invention is to provide a slide device for a vehicle which can adjust movement with a long adjusting stroke so that the second rail can be moved in a front-rearward direction along the first rail smoothly and without generating play therebetween.

Measures for Solving the Problems

The structural feature of the invention made for solving the above problems is characterized in that the slide device for a vehicle comprises a first rail, a second rail supported on the first rail and relatively movable thereto, an attaching portion formed at the second rail provided with an operating surface facing to the first rail, a non-operating surface formed at a reverse side of the operating surface and connecting regions for connecting the operating surface and the non-operating surface at both ends thereof in a rail moving direction, and a rolling element circulation unit attached to the attaching portion and having a plurality of rolling elements rolling by contacting with the operating surface and a surface formed at the first rail and facing to the operating surface and at the same time rolling and circulating to the non-operating surface via the connecting region.

BRIEF EXPLANATION OF ATTACHED DRAWINGS

Figure 2:
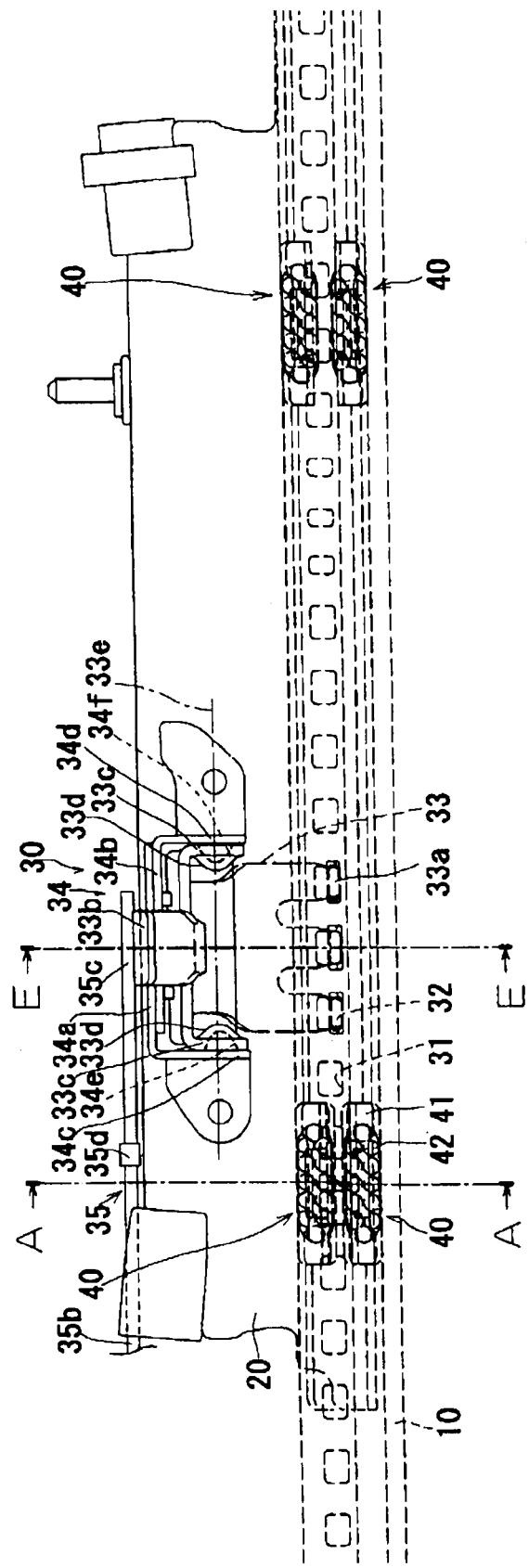
FIG. 2 is a side view of the seat slide device for a vehicle according to the first embodiment.
Figure 6:
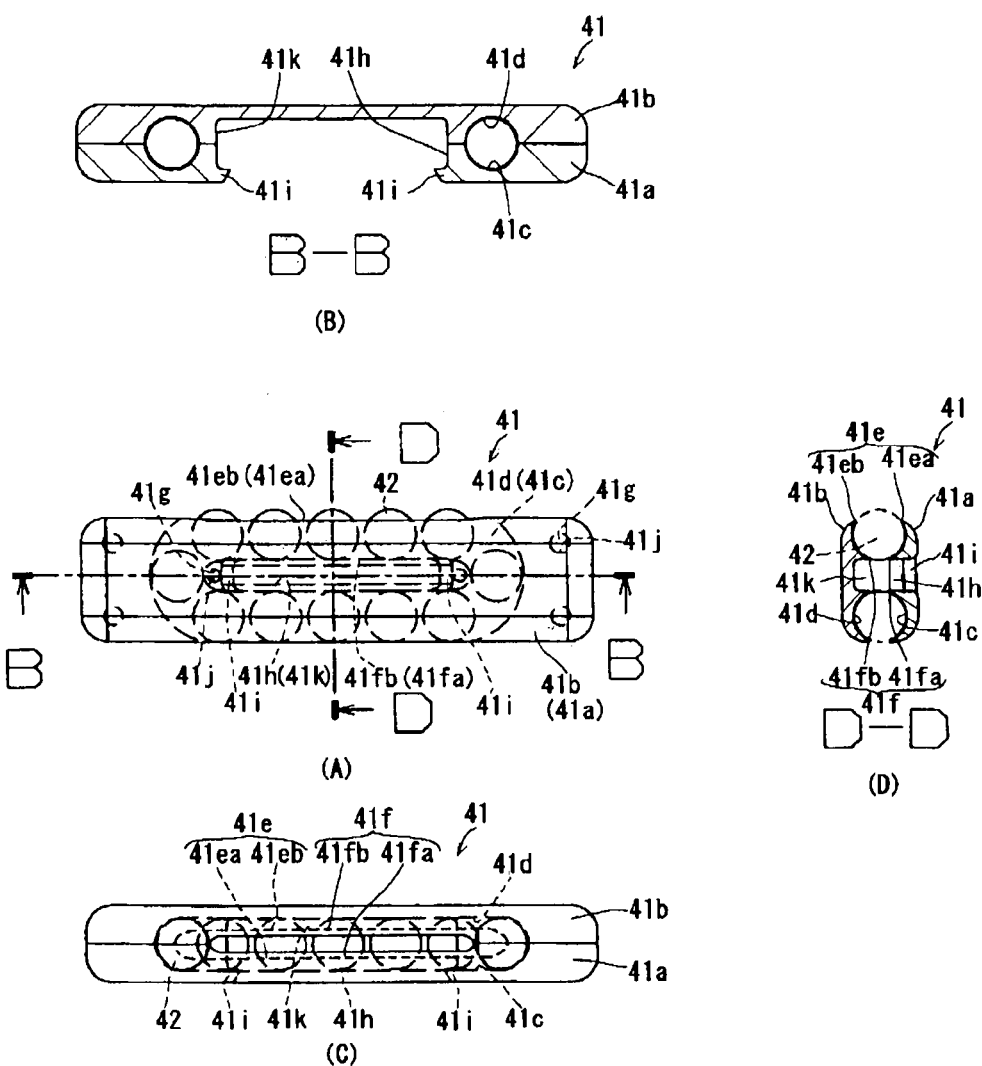
Figure 7:
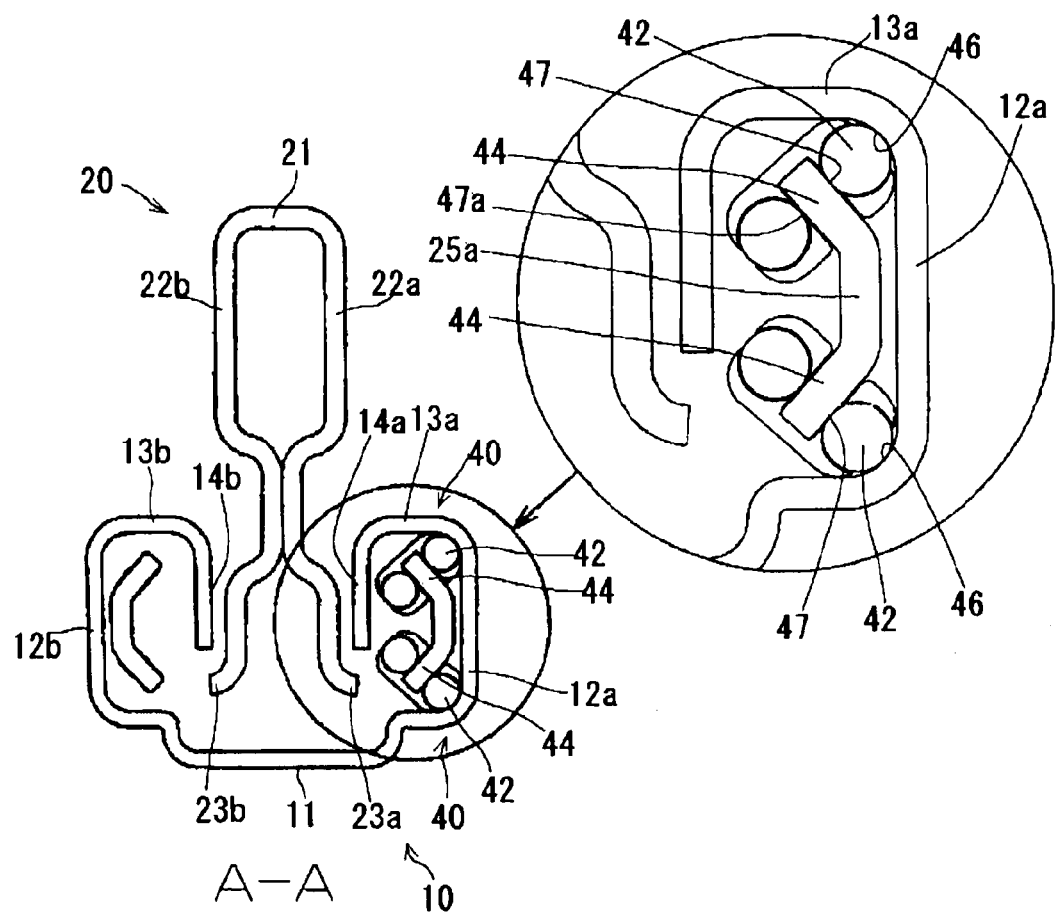
Figure 8:
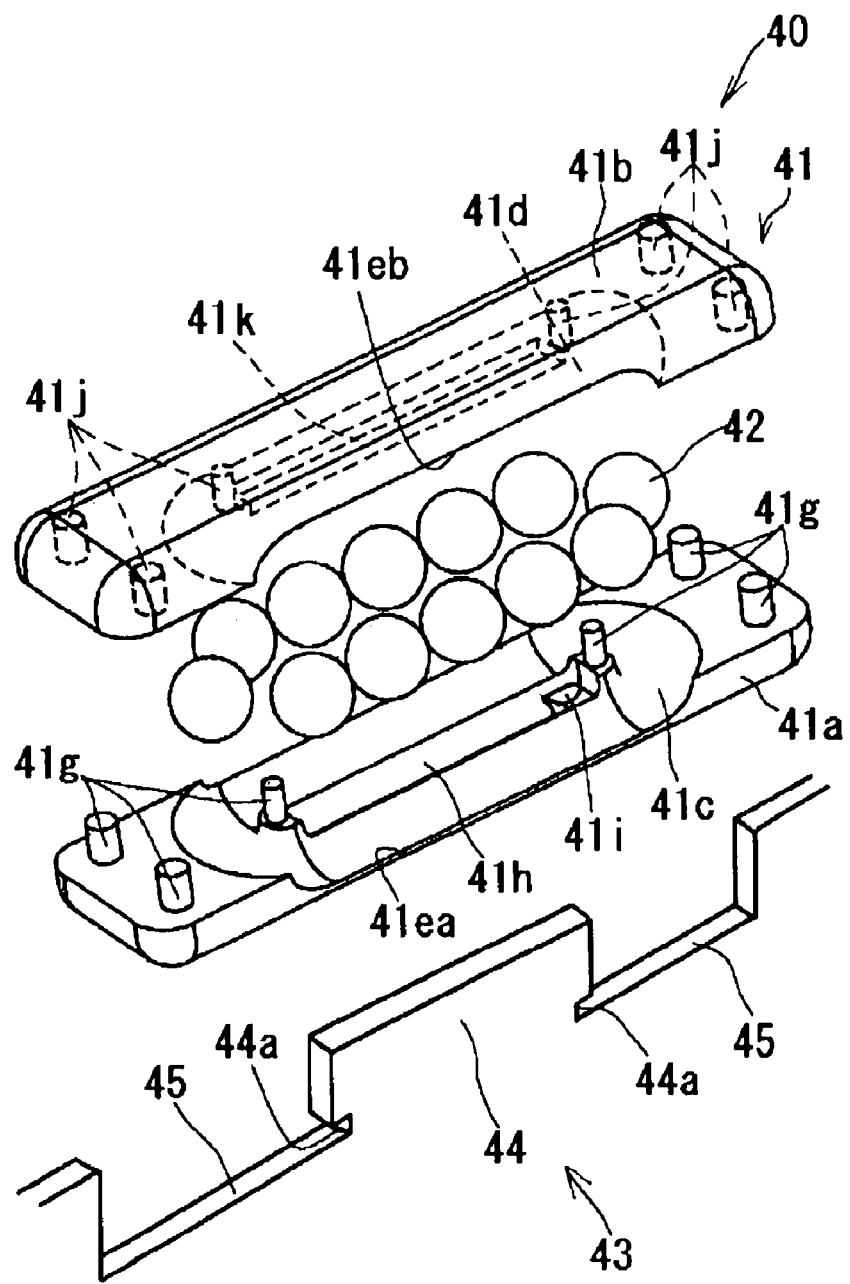
Figure 9:
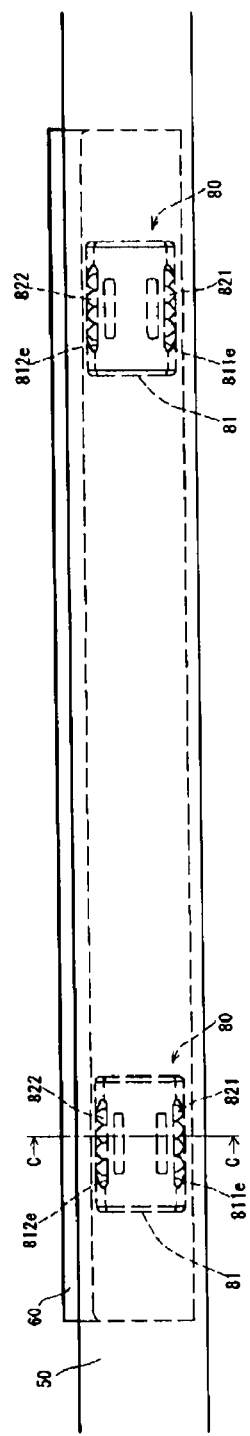
Figure 10:
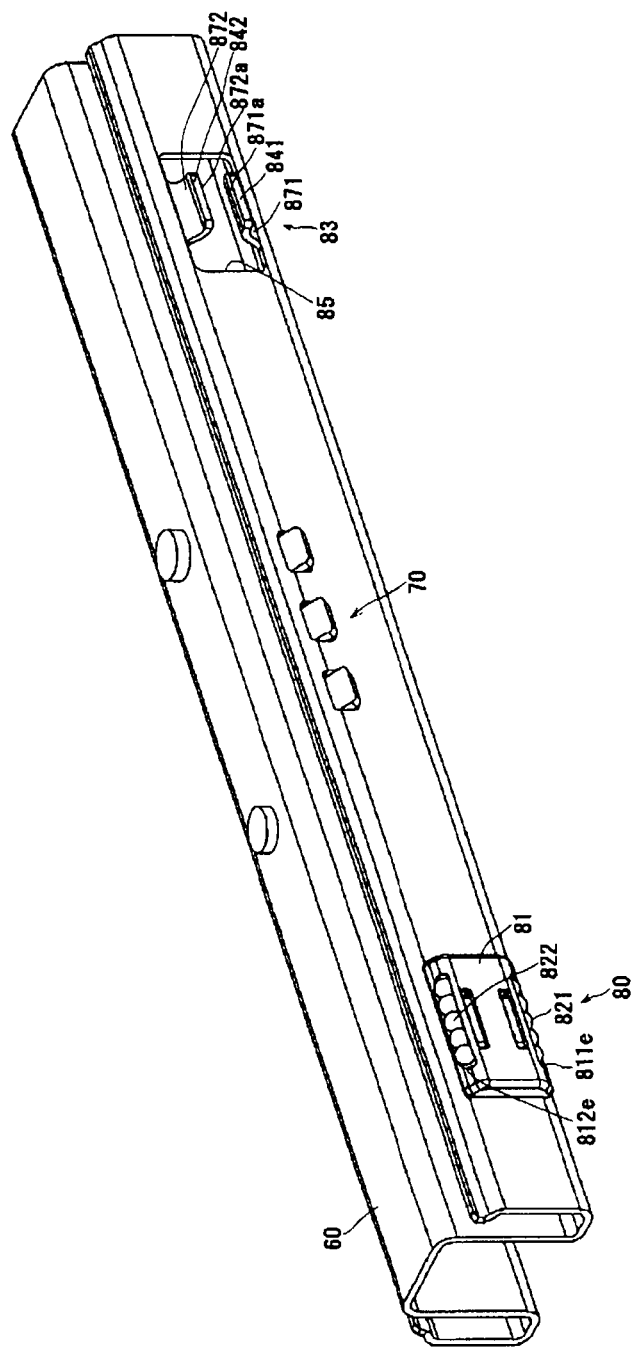
Figure 11:
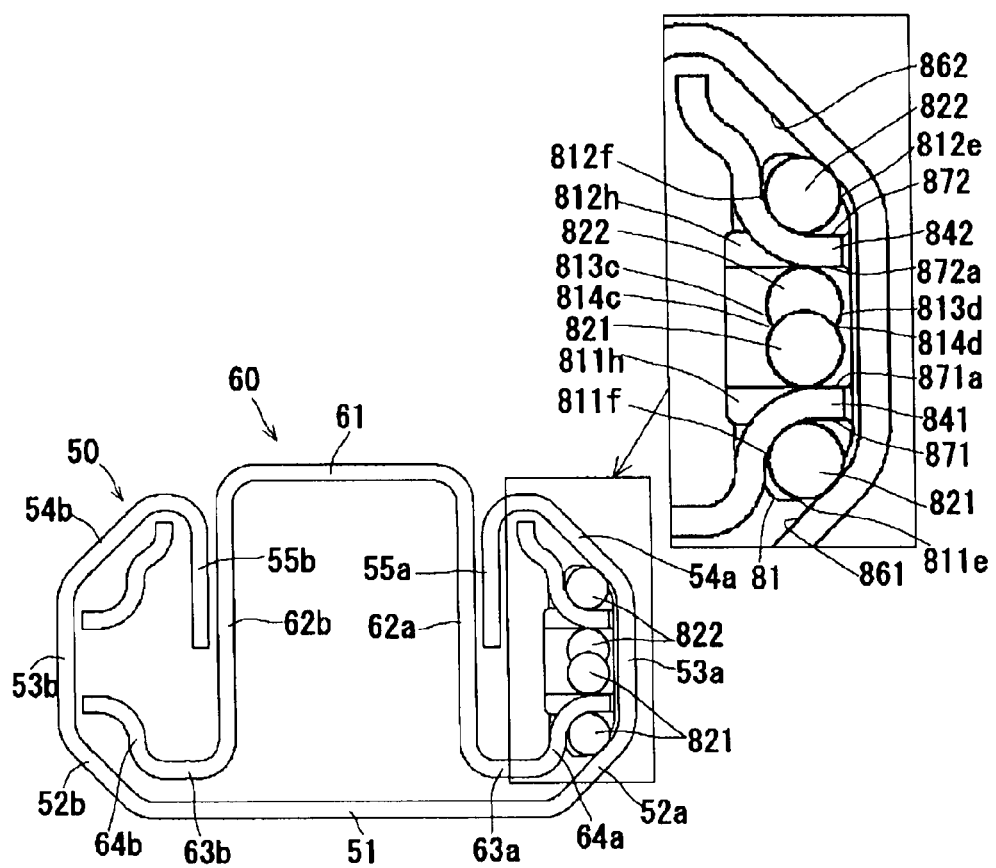
Figure 12:
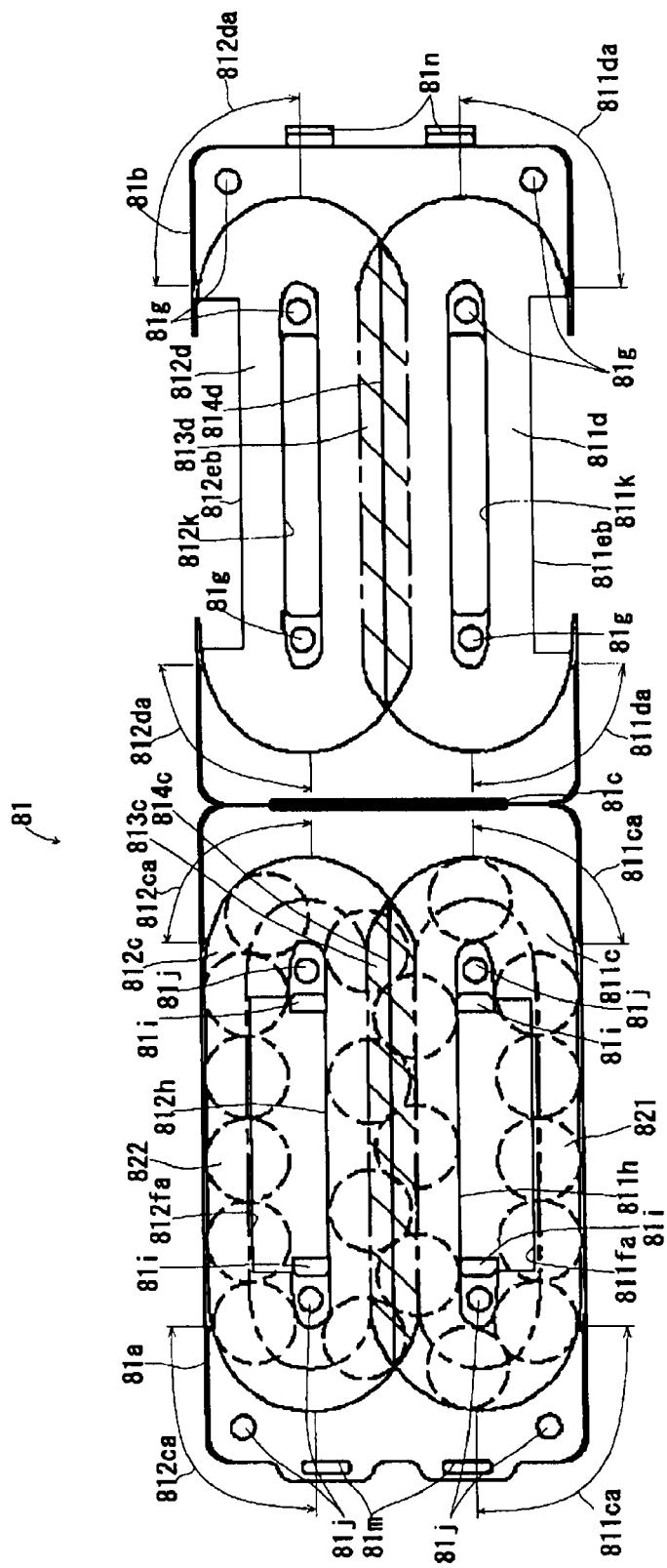
Figure 13:
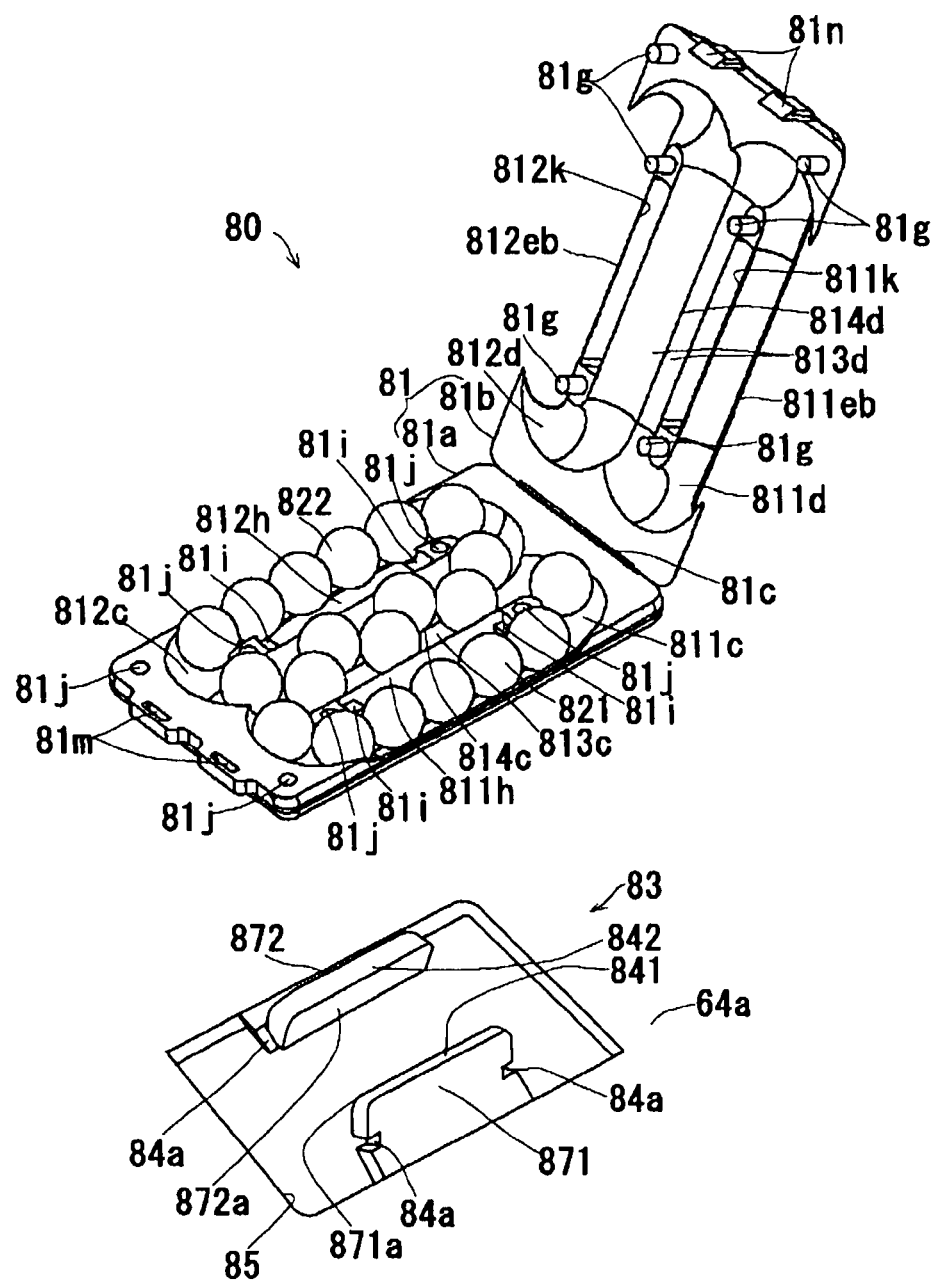

FIGS. 6(A), (B), (C) and (D) are a plane view, a side view, B-B line cross sectional view and D-D line cross sectional view of the rolling element circulation unit of the seat slide device for a vehicle shown in FIG. 2, respectively;

FIG. 7 is a sectional view taken along the line A-A of the rolling element circulation unit of the seat slide device for a vehicle shown in FIG. 2 and viewed from a front side;

FIG. 8 is a perspective view showing the assembling method and mounting method of the rolling element circulation unit of the seat slide device for a vehicle shown in FIG. 2;

FIG. 9 is a side view of the seat slide device for a vehicle according to the second embodiment;

FIG. 10 is a perspective view of the main part of the seat slide device for a vehicle shown in FIG. 9;

FIG. 11 is a sectional view taken along the line C-C of the rolling element circulation unit of the seat slide device for a vehicle shown in FIG. 9 and viewed from a front side;

FIG. 12 is a plane view showing the case in open condition of the rolling element circulation unit of the seat slide device for a vehicle shown in FIG. 9; and FIG. 13 is a perspective view showing the assembling method and mounting method of the rolling element circulation unit of the seat slide device for a vehicle shown in FIG. 9.

PREFERRED EMBODIMENTS FOR PRACTICING THE INVENTION

Figure 1:
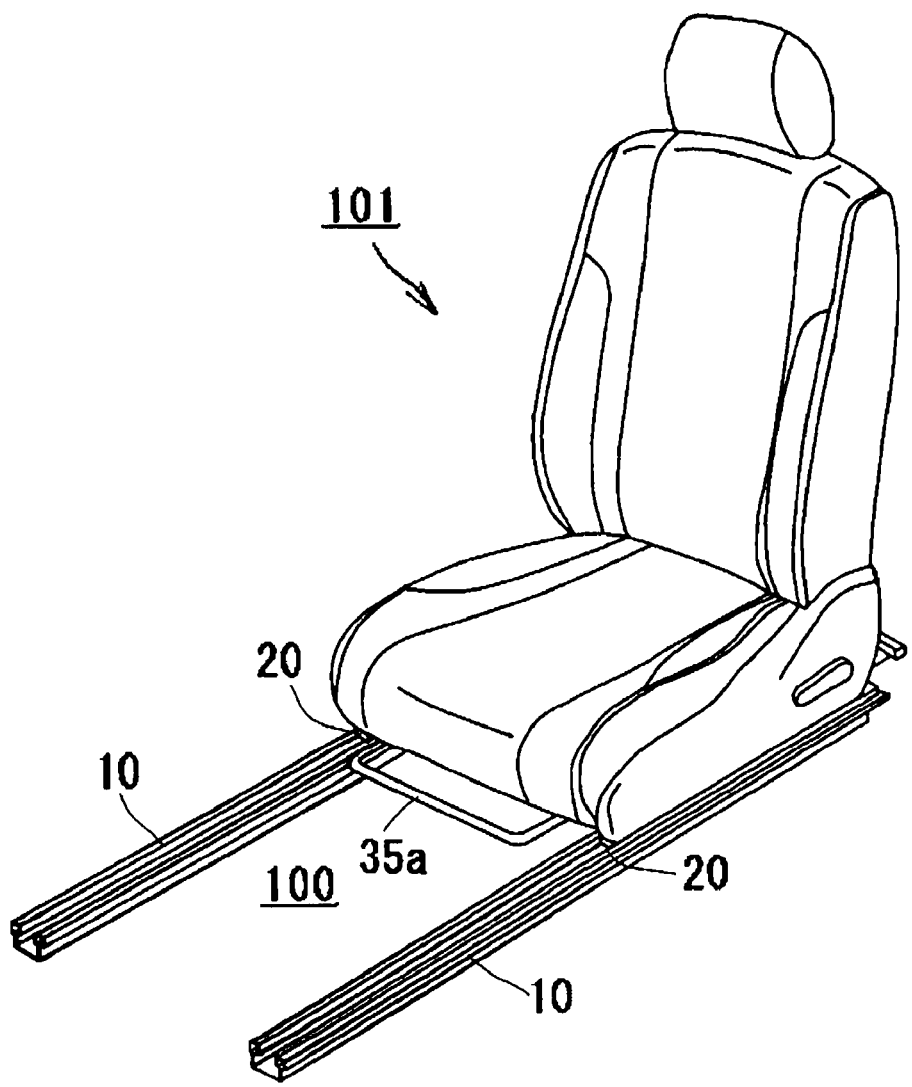
FIG. 1 is a perspective view of a vehicle seat to which a seat slide device for a vehicle according to the first and the second embodiments of the invention is to be adapted.

The first embodiment of the slide device for a vehicle of the present invention will be explained with reference to the attached drawings. The vehicle seat slide device for a vehicle includes as shown in FIGS. 1, 2 and 7, a pair of lower rails (first rail) 10 fixed to a vehicle floor 100 in a front-rearward direction of the vehicle, a pair of upper rails (second rail) 20 fixed to a vehicle seat 101 and movably supported on the lower rail 10 and a rolling element circulation unit 40 attached to an attaching portion 43 for smoothly without play moving the upper rail 20 relative to the lower rail 10. The attaching portion 43 includes connecting regions for connecting an operating surface 47 formed at the upper rail 20 and facing to the lower rail 10 and a non-operating surface 47a formed at a reverse side of the operating surface 47 at both ends thereof in a rail moving direction. The rolling element circulation unit 40 includes a case 41 which accommodates therein a plurality of balls (rolling elements) 42 which roll by contacting with the operating surface 47 of the attaching portion 43 and a surface 46 (hereinafter referred to as an operating surface) formed at the lower rail 10 and facing to the operating surface 47 and then roll and circulate to the non-operating surface 47a side via the connecting region.

Since the slide device for a vehicle according to this embodiment is adapted to the vehicle seat 101, a lock mechanism 30 is also provided for releasably locking the upper rail 20 relative to the lower rail 10. It should be noted here that the rolling element circulation units 40 are provided at upper, lower, right and left portions of each front side portion and each rear side portion of the pair of upper rails 20, totaling of eight (8) portions. In other words, in FIG. 7 showing the rail cross sectional view of the front portion of the right side upper rail 20 taken along the A-A line shown in FIG. 2, the rolling element circulation units are provided at the upper and lower portions, totaling of two (2) portions (same as at the rear side portion of the upper rail 20). However, since each structure is the same and the explanation thereof will be made with one single reference numeral hereinafter.

Figure 3:
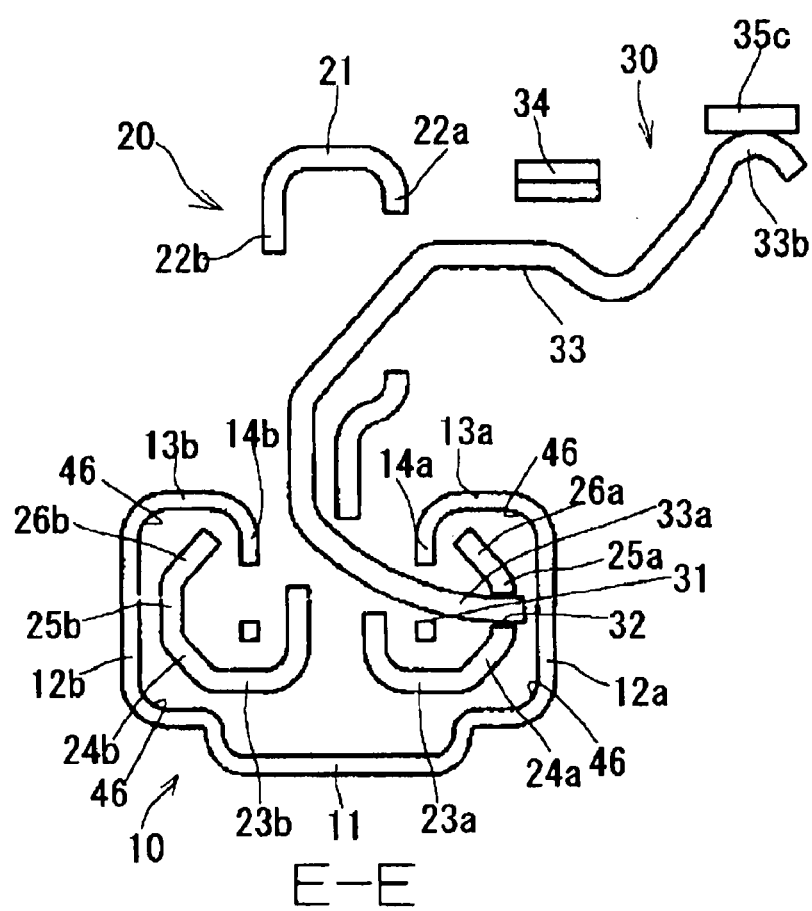
FIG. 3 is a sectional view taken along the line E-E of the lock mechanism of the seat slide device for a vehicle shown in FIG. 2 and viewed from a front side.

Next, each part will be explained in detail. As shown in FIG. 3, the lower rail 10 includes a base bottom portion 11 horizontal relative to the vehicle floor 100, an inside first side portion 12a and an outside first side portion 12b extending upwardly from both ends of the base bottom portion 11, an inside upper portion 13a and an outside upper portion 13b extending horizontally inwardly from the upper ends of both first side portions 12a and 12b and an inside second side portion 14a and an outside second side portion 14b extending downwardly from the inside ends of both upper portions 13a and 13b. A plurality of lock holes 31 of the lock mechanism 30, which will be explained later in detail, are arranged side by side in the inside second side portion 14a in a longitudinal direction of the lower rail 10.

The upper rail 20 includes a base plate portion 21 horizontally arranged relative to the vehicle floor 100, an inside drooping portion 22a and an outside drooping portion 22b extending downwardly from both ends of the base plate portion 21, an inside connecting portion 23a and an outside connecting portion 23b extending outwardly from the lower ends of both drooping portions 22a and 22b, an inside first inclined portion (plate shaped portion) 24a and an outside first inclined portion (plate shaped portion) 24b extending upwardly with an outward inclination from the outside ends of both connecting portions 23a and 23b, an inside upright portion 25a and an outside upright portion 25b extending upwardly from the upper ends of both first inclined portions 24a and 24b and an inside second inclined portion (plate shaped portion) 26a and an outside second inclined portion (plate shaped portion) 26b extending upwardly with an inside inclination from the upper ends of the upright portions 25a and 25b. Further, a plurality of (in this embodiment, three (3)) windows 32 of the lock mechanism 30 (later explained in detail), which can be positioned facing to the lock holes 31, are arranged side by side in the inside upright portion 25a of the front side portion of the upper rail 20 in a longitudinal direction.

Figure 4:
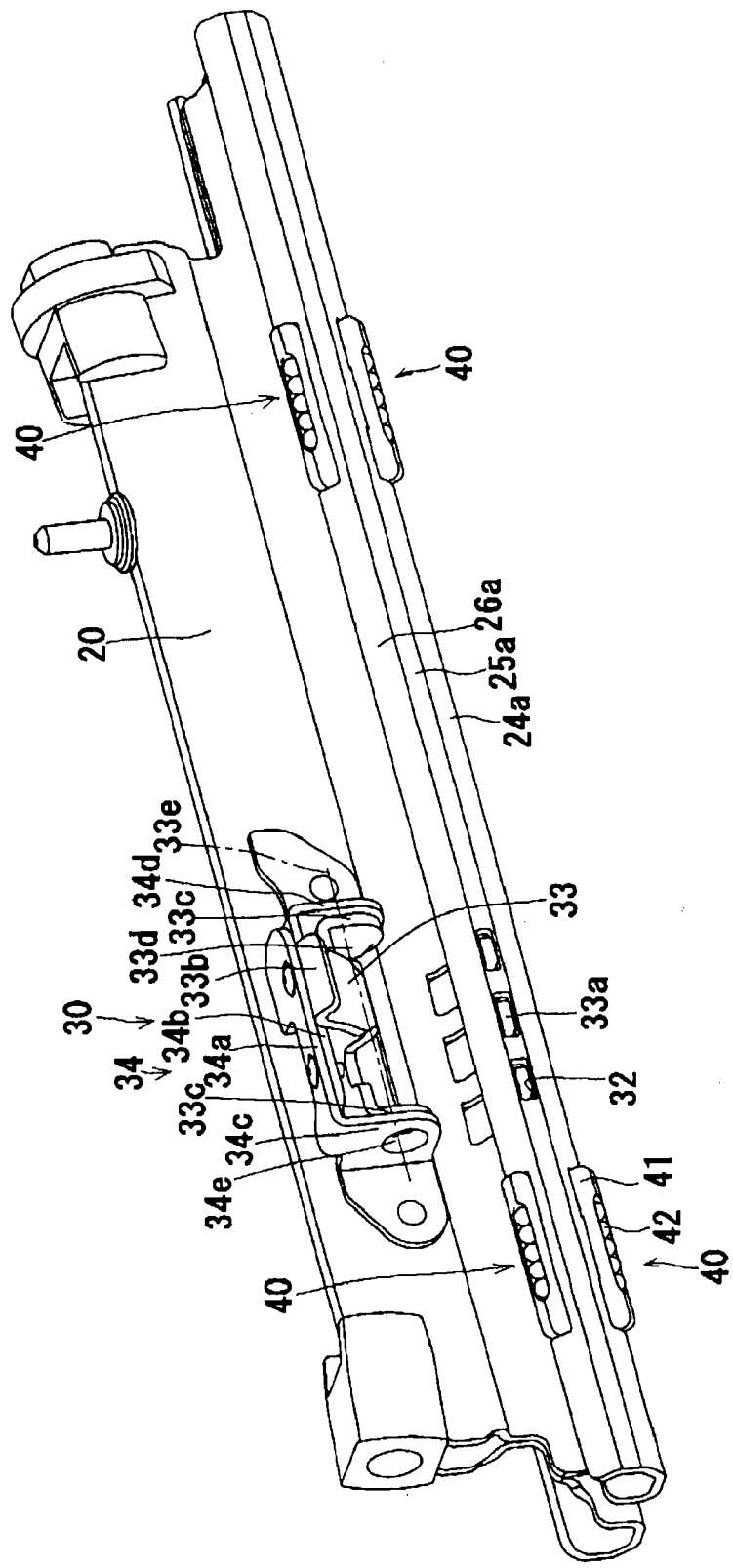
FIG. 4 is perspective view of the main part of the seat slide device for a vehicle shown in FIG. 2.

As shown in FIGS. 2 through 4, the lock mechanism 30 includes lock holes 31, windows 32, a lock lever 33, bracket 34 and a handle 35. The lock lever 33 is provided with a lock detent 33a at the lower portion thereof for detachably engaging with the lock holes 31. The lock lever 33 is always biased by a spring in a direction that the lock detent 33a engages with the lock holes 31. Further, the lock lever 33 is provided with a connecting portion 33b at the upper portion and this connecting portion 33b engages with a lever portion 35c of the handle 35, by which the lock lever 33 is rotated. The lock lever 33 is integrally provided with two rotation plates 33c at both ends thereof. The rotation plates 33c are supported by a bracket 34 and each rotation plate 33c is formed with a recessed portion 33d having a hemispherical concave surface.

The bracket 34 includes a first bracket 34a and a second bracket 34b. The bracket 34 is fixed to the inside drooping portion 22a of the upper rail 20 above the lower rail 10. The first and the second bracket 34a and 34b are integrally formed with support portions 34c and 34d, respectively for supporting thereon the lock lever 33. Each support portion 34c and 34d is formed with a convex or projecting portion 34e and 34f, respectively which faces to the recessed portion 33d of the rotation plate 33c to be received therein. Thus, by engaging the projecting portions 34e and 34f with the recessed portions 33d, the lock lever 33 is supported on the bracket 34 and is rotatable about a rotational axis line 33e extending in a longitudinal direction of the upper rail 20. Under the upper rail 20 being locked to the lower rail 10, the lock detent 33a of the lock lever 33 engages with the lock hole 31 and penetrates through the window 32.

The handle 35 is formed by bending a pipe material and includes a gripping portion 35a (Refer to FIG. 1) extending in a crosswise direction (direction at a right angle to the longitudinal direction of the upper rail 20), arm portions 35b formed by bending respective both ends of the gripping portion 35a with a right angle to be extending in parallel to each other and rotatably supported on the frame of the vehicle seat 101 around a rotational shaft portion 35d at both tip ends and the lever portion 35c connected to each tip end of the arm portions 35b at the rotational shaft portion 35d and engaged with the connecting portion 33b of the lock lever 33 for rotationally operating the lock lever 33. The handle 35 is always biased by a spring in a direction that the lever portion 35c engages with the connecting portion 33b of the lock lever 33. The biasing force applied to the handle 35 is set to be smaller than that applied to the lock lever 33 and accordingly, the lock detent 33a is normally engaged with the lock hole 31 and the window 32 to keep the locking condition. However, when an operator of the vehicle raises the gripping portion 35a of the handle 35, the lever portion 35c pushes down the connecting portion 33b of the lock lever 33 to release the engagement between the lock detent 33a and the lock hole 31 and the window 32 to release the locking condition.

As shown in FIGS. 2 and 4 through 6, the rolling element circulation unit 40 includes a plurality of balls 42 and the case 41 accommodating therein the plurality of balls 42 in a manner that they can circulate. The case 41 includes resin made cuboid shaped first and second cases 41a and 41b which can be connectable together by adhesive agent. The first and the second cases 41a and 41b are provided with grooves 41c and 41d for annularly arranging therein a plurality of (in this embodiment, twelve (12)) metallic balls 42. The grooves 41c and 41d have a semicircular shape in cross-sectional view and oval and annular shape in plain view. Band shaped recesses 41ea and 41eb are provided at the outer peripheral side surfaces of the first and the second cases 41a and 41b corresponding to one side linear portion of the grooves 41c and 41d. The recesses 41ea and 41eb are recessed at a portion shorter than the radius of the groove 41c or 41d in section. When the first and the second cases 41a and 41b are glued together, a first window portion 41e formed by the band shaped recesses 41ea and 41eb is formed so that the balls 42 arranged annularly in the grooves 41c and 41d are partially projecting therefrom.

Similarly, band shaped recesses 41fa and 41fb are provided at the inner peripheral side surfaces of the one side linear portions of the grooves 41c and 41d corresponding to the portions of the shaped recesses 41ea and 41eb. When the first and the second cases 41a and 41b are glued together, a second window portion 41f formed by the band shaped recesses 41fa and 41fb is formed so that the balls 42 arranged annularly in the grooves 41c and 41d are partially projecting therefrom. Thus the balls 42 can roll and circulate at the attaching portion 43 keeping in contact with the operating surface 47 of the attaching portion 43 and the operating surface 46 of the lower rail 10. It should be noted here that the third and fourth window portions are similarly formed by the band shaped recesses at the outer and inner peripheral side surfaces of the other side linear portions of the grooves 41c and 41d so that the balls 42 are partially projecting therefrom. However, the balls 42 merely freely roll and circulate in the third and fourth window portions.

Six (6) columnar shaped positioning projections 41g are provided on the groove 41c forming surface of the first case 41a at the outer sides of four corner portions of the groove 41c and at the both ends of the inner portions enclosed by the groove 41c and a slit shaped fitting hole 41h is provided between the projections 41g at the inner portion enclosed by the groove 41c for receiving the attaching portion 43. This slit shaped fitting hole 41h is provided with elastically engaging detents (elastically engaging portions) 41i at both ends for elastically engaging with the attaching portions 43. Six cylindrical positioning holes 41j are provided on the groove 41d forming surface of the second case 41b at the positions corresponding to the six (6) columnar shaped positioning projections 41g to be respectively fitted into by the positioning projections 41g and a slit shaped fitting groove 41k is provided between the positioning holes 41j at the inner portion enclosed by the groove 41d for receiving a tip end portion of the attaching portion 43.

The attaching portions 43 are provided at the front and the rear portions of the first inclined portion 24a and the second inclined portion 26a of the upper rail 20, totaling of four (4) portions. These four attaching portions are formed symmetrically at four corners of the pair of upper rails 20 in cross section. Each attaching portion 43 is formed with the rolling element operating portion 44 and the recessed portions 45. The rolling element operating portion 44 is formed to be in rectangular shape so that the rolling element operating portion 44 can be inserted into the fitting hole 41h of the case 41 and the recessed portion is formed to be in rectangular shape 45 so that the case 41 can be fixed in a longitudinal direction, in other words, the recessed portions are formed to be in rectangular shape and provided at both sides of the rolling element operating portion 44 so that the both sides of the case 41 in longitudinal direction can be held when the fitting hole 41h of the case 41 is inserted into the rolling element operating portion 44.

Figure 5:
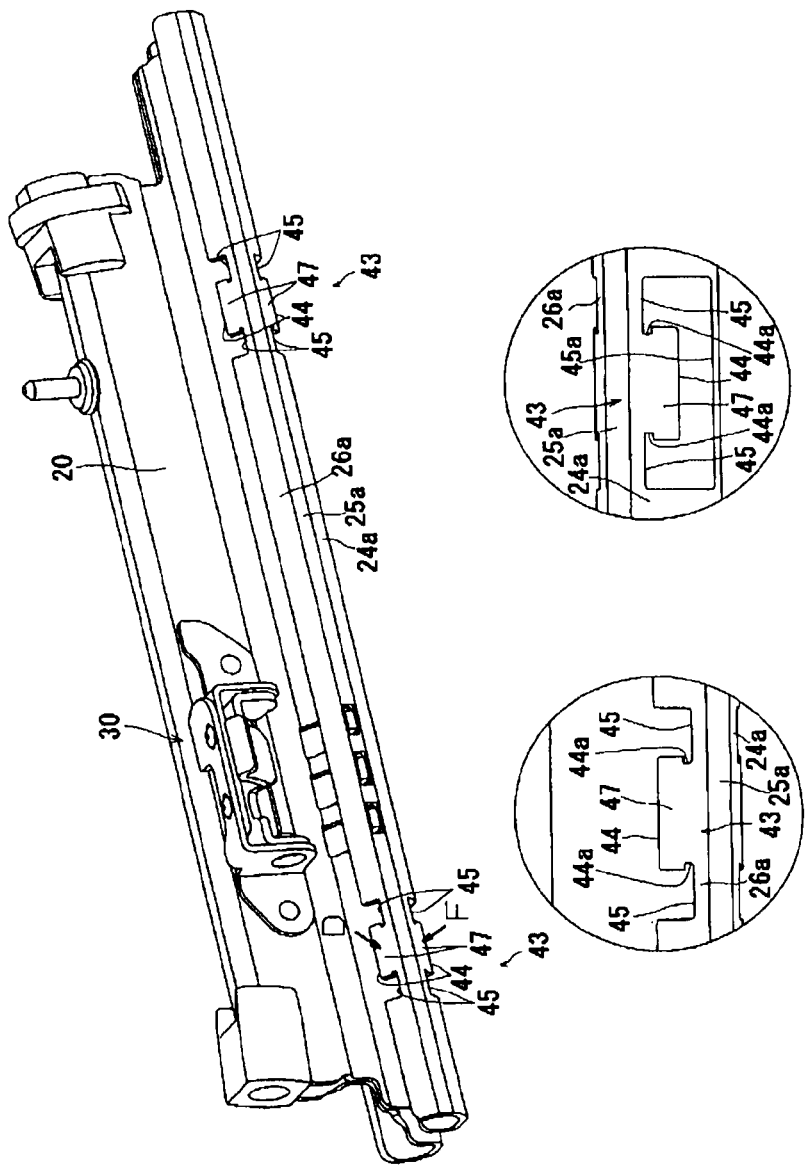
FIG. 5 is a perspective view of the main part of the seat slide device for a vehicle shown in FIG. 4, but the rolling element circulation unit being removed therefrom.

At both root sides of the rolling element operating portion 44, detent engaging portions (elastic engaging portions) 44a are formed so that the elastic engaging detents 41i of the fitting hole 41h can be elastically engaged with the detent engaging portions 44a when the fitting hole 41h of the case 41 is inserted. As shown in FIG. 5 viewed from D direction, since the upper end of the second inclined portion 26a is formed as a free end, the rolling element operating portion 44 can be formed by providing the recessed portions 45, however, as shown in FIG. 5 viewed from F direction, since the upper end of the first inclined portion 24a is consecutively connected to the upright portion 25a and the lower end is consecutively connected to the connecting portion 23a, the rolling element operating portion 44 can be formed by the recessed portions 45 and a convex shape forming hole 45a penetrating the first inclined portion 24a to surround the three sides of the rolling element operating portion 44.

When the case 41 accommodating the balls 42 is attached to the rolling element operating portion 44, as shown in FIG. 7, an inner surface of corner portion formed between the base bottom portion 11 and the inside first side portions 12a of the lower rail 10, an inner surface of corner portion formed between the inside first side portions 12a and the inside upper portions 13a and an outer surface of the rolling element operating portion 44 of the upper rail 20 facing to the respective inner surface of corner portion are formed to sandwich the balls 42 at the first window portion 41e side so that the balls can be rolled. In other words, the inner surface of corner portion formed between the base bottom portion 11 and the inside first side portions 12a and the inner surface of corner portion formed between the inside first side portions 12a and the inside upper portions 13a are formed to be of a circular surface shape having a radius approximately the same with that of the balls 42 to be the operating surface 46, on which the balls 42 roll, and the outer surface of the rolling element operating portion 44 is formed to be of an inclined surface inclined with approximately 45 degrees so that the outer surface faces with the operating surface 46 to be the operating surface 47 on which the balls 42 roll. Thus structured rolling element circulation units 40 are provided at four corners of the pair of upper rails 20 in cross section and accordingly, play in up-down and right-left directions can be eliminated when the upper rail 20 is assembled to the lower rail 10 and at the same time front-rearward movement can be smoothly performed.

The assembling of thus structured rolling element circulation unit 40 and mounting the unit to the upper rail 20 will be explained with reference to FIG. 8. First, adhesive agent is applied on the forming surface of the first case 41 formed with the groove 41c, then the forming surface is turned up and twelve (12) balls 42 are annularly arranged in the groove 41c of the first case 41a. Then, the forming surface of the second case 41b formed with the groove 41d is faced down to cover the forming surface of the first case 41a formed with the groove 41c. Thus, the projections 41g of the first case 41a are inserted into the holes 41i of the second case 41b and the positioning of the forming surface formed with the groove 41c and the forming surface formed with the groove 41d is defined and then both surfaces are adhered to each other. After these processes, the balls 42 are freely rolled along the grooves 41c and 41d and sandwiched therein thereby for integration.

Next, the rolling element circulation unit 40 is positioned in such manner that the fitting hole 41h of the first case 41a points to the tip end side of the rolling element operating portion 44 of the upper rail 20 and the first window portion 41e formed so that portions of the annularly arranged balls 42 are projecting therefrom points to the opposite side of the rolling element operating portion 44. Then the rolling element operating portion 44 is inserted into the fitting hole 41h and at this operation, the elastic engaging detents 41i formed at both ends of the fitting hole 41h are elastically deformed by the both tip ends of the rolling element operating portion 44. Finally, after the rolling element operating portion 44 is engaged with the fitting hole 41h and the fitting groove 41k, the elastic engaging detents 41i are restored by the detent engaging portion 44a of the rolling element operating portion 44 and elastically engaged therewith. At this stage, both ends of the case 41 in the longitudinal direction are sandwiched in the recessed portions 45 formed at both sides of the rolling element operating portion 44 and fixed thereto in a longitudinal direction. Thus, the assembling of the rolling element circulation unit 40 and the mounting thereof to the upper rail 20 are completed.

After the rolling element circulation units 40 are mounted to the rolling element operating portions 44 provided at eight portions of the pair of upper rails 20, the pair of upper rails 20 are inserted into the pair of lower rails 10. Thus, the plurality of balls 42, portions of which are projecting from the first window portion 41e and the second window portion 41f, are sandwiched between the operating surface 46 of the lower rail 10 and the operating surface 47 of the rolling element operating portions 44 of the upper rail 20. Here, the balls 42 projecting from the third window portion are under free condition relative to the rolling element operating portions 44 by separating therefrom due to the own weight of the balls or merely contacting therewith. Under this structure, the balls 42 roll and circulate in a front-rearward direction of the upper rail 20 in the rolling element operating portions 44 and the recessed portions 45, keeping in contact with the operating surfaces 46 of the lower rail 10 and the operating surface 47 of the rolling element operating portions 44 provided on the upper rail 20, when the upper rail 20 relatively moves on the lower rail 10 in a front-rearward direction.

The second embodiment of the slide device for a vehicle according to the invention will be explained hereinafter with reference to the attached drawings. The slide device for a vehicle according to the second embodiment includes, as shown in FIGS. 9 through 11, a pair of lower rails (first rail) 50 fixed to a vehicle floor (not shown) in a front-rearward direction of the vehicle, a pair of upper rails (second rail) 60 fixed to a vehicle seat (not shown) and movably supported on the lower rail 50 and a rolling element circulation unit 80 attached to an attaching portion 83 for smoothly moving the upper rail 60 relative to the lower rail 50 without generating play or rattling noise. It should be noted here that FIG. 10 shows the condition that the rolling element circulation unit 80 to be provided at the rear side of the upper rail 60 has been removed.

The attaching portion 83 includes two operating surfaces (hereinafter, referred to as a first operating surface 871 and a second operating surface 872) of the upper rail 60, facing to the lower rail 50 and two non-operating surfaces (hereinafter, referred to as a first non-operating surface 871a and a second non-operating surface 872a) formed at reverse sides of the first and the second operating surfaces 871 and 872. The two operating surfaces and two non-operating surfaces are respectively connected at connecting regions at both ends in a rail movement direction. The rolling element circulation unit 80 includes a case 81 accommodating a plurality of balls (rolling element) (hereinafter, referred to as a first balls 821 and a second balls 822) which roll keeping in contact with the first and the second operating surfaces 871 and 872 of the attaching portion 83 and two surfaces (hereinafter referred to as a first operating surface 861 and a second operating surface 862) of the lower rail 50 facing to the first and the second operating surfaces 871 and 872 and at the same time roll and circulate to the first and the second non-operating surfaces 871a and 872a side through the connecting region.

Since the slide device for a vehicle according to this embodiment is adapted to the vehicle seat, a lock mechanism 70 is also provided for releasably locking the upper rail 60 to the lower rail 50. It should be noted here that the rolling element circulation units 80 are provided at right and left portions of each front side portion and each rear side portion of the pair of upper rails 60 totaling of four (4) portions. In other words, in FIG. 11 showing the rail cross sectional view of the front side portion of the upper rail 60 taken along the C-C line in FIG. 9, the rolling element circulation units are provided at the right side rail and left side rail (not shown), totaling of two (2) portions (same as at the rear side portion of the rail 60). However, since each structure is the same and the explanation thereof will be made with one single reference numeral hereinafter.

Next, each part will be explained in detail. As shown in FIG. 11, the lower rail 50 includes a base bottom portion 51 horizontal relative to the vehicle floor, an inside first side portion 52a and an outside first side portion 52b extending upwardly with an inclination towards outside, from both ends of the base bottom portion 51, an inside second side portion 53a and an outside second side portion 53b extending upwardly from the upper ends of the inside first side portion 52a and the outside first side portion 52b, an inside third side portion 54a and an outside third side portion 54b extending upwardly with an inclination towards inside, from the upper ends of the inside second side portion 53a and the outside second side portion 53b and an inside fourth side portion 55a and an outside fourth side portion 55b extending downwardly from the upper ends of the inside third side portion 54a and the outside third side portion 54b.

The upper rail 60 includes a base plate portion 61 arranged horizontally relative to the vehicle floor, an inside drooping portion 62a and an outside drooping portion 62b extending downwardly from both ends of the base plate portion 61, an inside connecting portion 63a and an outside connecting portion 63b extending outwardly from the lower ends of both drooping portions 62a and 62b and an inside upright portion (plate shaped portion) 64a and an outside upright portion (plate shaped portion) 64b extending upwardly from respective ends of the inside connecting portion 63a and the outside connecting portion 63b.

As shown in FIGS. 11 through 13, the rolling element circulation unit 80 includes a plurality of first and second balls 821 and 822 and a case 81 accommodating the first and the second balls 821 and 822 therein for circulation of the balls. The case 81 includes resin made, flat plate shaped first and second cases 81a and 81b, having an openably and closably connected connecting portion 81c at one end side. The first and the second cases 81a and 81b are respectively provided with two same shape grooves having a semicircular shape in cross sectional view and oval and annular shape in plain view (hereinafter, referred to as first grooves (circulation passages) 811c and 811d, and second grooves (circulation passages) 812c and 812d). The first and the second grooves are formed side by side with each other to be overlapped by a groove radius value in cross section with the longitudinal directions of the oval and annular shapes thereof being in parallel.

In other words, the first grooves 811c and 811d and the second grooves 812c and 812d are formed to be overlapped with the regions indicated by shaded areas in FIG. 12 enclosed by the length of approximately inside straight portion of the groove and the length of groove radius in cross section. These shaded areas are named as common groove portions 813c and 813d. The common groove portions 813c and 813d extend in a longitudinal direction and are divided into two halves by a partition wall portions 814c and 813d having a triangular shape in cross sectional view. In the first and the second grooves 811c, 811d and 812c, 812d thus structured, a plurality of (in this embodiment, ten (10)) metal made first and second balls 821 and 822 are arranged annularly. By arranging the first balls 821 and the second balls 822 alternately in the common grooves 813c and 813d in advance, the first and the second balls 821 and 822 can alternately roll and circulate without mixing. In general, in order to make the first and the second balls 821 and 822 roll and circulate alternately without mixing, it is necessary to individually form the first and the second grooves 811c, 811d and 812c, 812d or to provide two rolling element circulation units. However, by providing the common groove portions 813c and 813d and the partition wall portions 814c and 814d, forming individual annular grooves is not necessary and providing one rolling element circulation unit 80 would suffice. This can reduce the space for the attaching portion 83 and at the same time the number of part of the rolling element circulation unit 80 can be reduced.

The first and the second grooves 811c, 811d and 812c, 812d are formed with an oval annular shape and outer peripheral surfaces of both end portions, i.e., the outer peripheral surfaces, through which the first and the second balls 821 and 822 pass, upon rolling from the inside straight line portions of the first and the second grooves 811c, 811d and 812c, 812d to the outside straight line portions thereof and from the outside straight line portions to the inside straight line portions thereof are formed to be of a shape having a conic curve except a semicircular curve (hereinafter, referred to as conic curve portions 811ca, 811da and 812ca, 812da). Comparing with the case in which the outer peripheral portions of both end portions of the first and the second grooves 811c, 811d and 812c, 812d are formed with a semicircular shape, the first and the second balls 821 and 822 roll more gradually in the case in which the outer peripheral portions are formed to be the conic curve portions 811ca, 811da and 812ca, 812da and accordingly, the contact degree with the lower rail 50 can be reduced to suppress the generation of abnormal noise.

The outer peripheral side surfaces of the second case 81b corresponding to the outside straight line portions of the first and the second grooves 811d and 812d of the second case 81b are formed with band shaped recesses 811eb and 812eb recessed in depth by a length of the radius in cross section of the first and the second grooves 811d and 812d. The first and the second window portions 811e and 812e are formed by the outer peripheral side surfaces of the first case 81a corresponding to the outside straight line portions of the first and the second grooves 811c and 812c of the first case 81a and the band shaped recesses 811eb and 812eb when the first and the second cases 81a and 81b are closed and are formed so that the portions of the first and the second balls 821 and 822 may project therefrom.

Similarly, the inner side surfaces of the first case 81a corresponding to the inner straight line portions of the first and the second grooves 811c and 812c of the first case 81a are formed with band shaped recesses 811fa and 812fa recessed in depth by a length of the radius in cross section of the first and the second grooves 811c and 812c. The third and the second case 81b corresponding to the inside straight line portions of the first and the second grooves811d and 812d of the second case 81b and the band shaped recesses 811fa and 812fa when the first and the second cases 81a and 81b are closed and are formed so that the portions of the first and the second balls 821 and 822 may project therefrom. Thus the first and the second balls 821 and 822 can roll and circulate at the attaching portion 83 keeping in contact with the first and the second operating surfaces 871 and 872 of the attaching portion 83 and the first and the second operating surfaces 861 and 862 of the lower rail 50.

Six (6) cylindrical positioning holes 81j are provided on the groove forming surfaces of the first case 81a formed with the first and the second grooves 811c and 812c in the vicinity of two corners of one end side (opposite to the connecting portion 81c) of the first and the second grooves 811c and 812c and at both ends of the inner portions enclosed by the first and the second grooves 811c and 812c and fitting holes (hereinafter referred to as a first fitting hole 811h and a second fitting hole 812h) for receiving the attaching portion 83 are formed by penetration between the positioning holes 81j through the inner portions enclosed by the first and the second grooves 811c and 812c. An elastically engaging detents (elastically engaging portions) 81i are formed on both end portions of the first and the second fitting holes 811h and 812h for elastic engagement with the attaching portion 83. Two engaging holes (engaging portion) 81m for fixing the first and the second cases 81a and 81b together when the cases 81a and 81b are closed are provided at a side portion of one end side (opposite to the connecting portion 81c) of the first and the second grooves 811c and 812c of the first case 81a.

Further, the forming surfaces of the second case 81b formed with the first and the second grooves 811d and 812d are provided with six columnar positioning projections 81g, which are to be inserted into the corresponding each positioning hole 81j at the positions corresponding to the six (6) positioning holes 81j and formed with slit shaped fitting grooves (hereinafter referred to as a first fitting groove 811k and a second fitting groove 812k) between the positioning projections 81g at the inner portions enclosed by the first and the second grooves 811d and 812d for receiving a tip end of the attaching portion 83. Two engaging detents (engaging portion) 81n are provided on a side portion of the one end side (opposite to the connecting portion 81c) of the first and the second grooves 811d and 812d of the second case 81b at positions corresponding to the two engaging holes 81m for engaging therewith. Oval annular tangential lines which touch the insides of ten (10) first balls 821 and the insides of ten (10) second balls 822 arranged in the first and the second grooves 811c, 811d and 812c, 812d form the fitting portions for receiving the first and the second rolling element operating portions 841 and 842 received in the first and the second fitting holes 811h and 812h and the first and the second fitting grooves 811k and 812k.

As shown in FIGS. 10 and 13, the attaching portions 83 are formed at the front and rear side portions of the upright portion 64a of the upper rail 60, totaling of two portions. Further, the attaching portions are formed at two portions symmetrically at right side and left side of the pair of upper rails 60 in cross section. Each attaching portion 83 is provided with two rolling element operating portions (hereinafter, referred to as a first rolling element operating portion 841 and a second rolling element operating portion 842) and a recessed portion 85. The first and the second rolling element operating portions 841 and 842 are formed with a rectangular shape for being inserted into the first and the second fitting holes 811*h* and 812*h* of the case 81 and the first and the second rolling element operating portions 841 and 842 are formed at each upper and lower portion of the upright portion 64*a* of the upper rail 60 extending outwardly in a horizontal direction in parallel with each other.

The recessed portion 85 of a rectangular shape is formed to enclose both sides of the first and the second rolling element operating portions 841 and 842 so that the recessed portion 85 can hold the case 81 in a longitudinal direction, i.e., so that the recessed portion 85 can hold the both sides of the case 81 in a longitudinal direction after the first and the second receiving hole 811*h* and 812*h* of the case 81 are fitted in the first and the second rolling element operating portions 841 and 842. Detent engaging portions (elastically engaging portion) 84*a* are formed on both root portions of the first and the second rolling element operating portions 841 and 842 so that the elastically engaging detents 81*i* formed at the first and the second receiving holes 811*h* and 812*h* can be elastically engaged therewith when the first and the second receiving holes 811*h* and 812*h* of the case 81 are fitted in. The first and the second rolling element operating portions 841 and 842, recessed portion 85 and detent engaging portions 84*a* are formed by making the upright portion 64*a* with punching and bending processes.

When the case 81 accommodating therein the first and the second balls 821 and 822 is mounted to the first and the second rolling element operating portions 841 and 842, as shown in FIG. 11, the outer surfaces of the first and the second rolling element operating portions 841 and 842 of the upper rail 60 and the inner surface of the first side portions 52*a* and the inner surface of the third side portions 54*a* of the lower rail 50 corresponding to the respective outer surfaces are formed so that the first and the second balls 821 and 822 at the first and the second window portions 811*e* and 812*e* side are rollably held therebetween. In other words, the outer surface of the first rolling element operating portion 841 is formed as the first operating surface 871 on which the first balls 821 roll having a downward circular surface with the radius approximately the same as that of the first ball 821. The outer surface of the second rolling element operating portion 842 is formed as the second operating surface 872 on which the second balls 822 roll having an upward circular surface with the radius approximately the same as that of the second ball 822. Further, the inner surfaces of the first side portion 52*a* is formed as the first operating surface 861 on which the first balls 821 roll at an inclined surface inclined outwardly with 45 degrees to face to the first operating surface 871. The inner surface of the third side portions 54*a* is formed as the second operating surface 862 on which the second balls 822 roll at an inclined surface inclined inwardly with 45 degrees to face to the second operating surface 872.

The first and the second grooves 811*c*, 811*d* and 812*c*, 812*d* of the case 81 are arranged to be approximately in parallel with the upright portion 64*a* of the upper rail 60. Accordingly, the first and the second balls 821 and 822 rolling in the first and the second grooves 811*c*, 811*d* and 81*c*, 812*d* advance to or retreat from the first and the second operating surfaces 861 and 862 of the lower rail 50 with approximately 45 degrees inclined relative thereto. This can reduce the contact degree of the balls with the first and the second operating surfaces 861 and 862 thereby to suppress the generation of abnormal noise. Further, since the rolling element circulation units 80 thus structured are provided at right and left portions in cross section of the pair of upper rails 60, the play in up-down and right-left directions can be eliminated when the upper rails 60 are assembled to the lower rails 50 and at the same time the movement in a front-rearward direction can be smoothly performed.

The assembling of thus structured rolling element circulation unit 80 and mounting the unit to the upper rail 60 will be explained with reference to FIG. 13. First, the forming surface of the first case 81*a* formed with the first and the second grooves 811*c* and 812*cis* turned up and ten (10) balls of each of the first and the second balls 821 and 822 are annularly arranged in the first and the second grooves 811*c* and 812*c*. At this time, the first and the second balls 821 and 822 are alternately arranged in the common grooves 813*c* and 813*d*. Then, the second case 81*b* is rotated about the connecting portion 81*c* and the forming surface formed with the first and the second grooves 811*d* and 812*d* is covered on the forming surface formed with the first and the second grooves 811*c* and 812*c* of the first case 81*a* to engage the engaging detent 81*n* with the engaging hole 81*m*. Thus, the positioning projections 81*g* of the second case 81*b* are inserted into the positioning holes 81*j* of the first case 81*a* and the forming surface formed with the first and the second grooves 811*c* and 812*c* and the forming surface formed with the first and the second grooves 811*d* and 812*d* are positioned and adhered to each other. After these processes, the first and the second balls 821 and 822 are sandwiched to freely roll in the first and the second grooves 811*c*, 811*d* and 812*c*, 812*d* to be integrated.

Next, the first case 81*a* is positioned so that the first and the second fitting holes 811*h* and 812*h* of the first case 41*a* point to the tip end side of the first and the second rolling element operating portions 841 and 842 of the upper rail 60 and the first and the second rolling element operating portions 841 and 842 are inserted into the first and the second fitting holes 811*h* and 812*h*. At this stage, since the rolling element circulation unit 80 is formed to be of a flat plate shape and the first and the second rolling element operating portions 841 and 842 are formed to be projecting in parallel with each other, the rolling element circulation unit 80 can be easily attached just by laterally inserting the rolling element circulation unit 80 into the first and the second rolling element operating portions 841 and 842. This can drastically reduce the assembling hour of the vehicle slide device.

When the first and the second rolling element operating portions 841 and 842 are inserted into the first and the second fitting holes 811*h* and 812*h*, the elastically engaging detents 81*i* formed at both ends of the first and the second fitting holes 811*h* and 812*h* are elastically deformed by the tip ends of the first and the second rolling element operating portions 841 and 842. Finally, after the first and the second rolling element operating portions 841 and 842 are engaged with the first and the second fitting holes 811*h* and 812*h* and the first and the second fitting grooves 811*k* and 812*k*, the elastically engaging detents 81*i* are restored by the detent engaging portions 84*a* of the first and the second rolling element operating portions 841 and 842 and elastically engaged therewith. At this stage, both ends of the case 81 in the longitudinal direction are sandwiched by the recessed portions 85 formed to enclose both sides of the first and the second rolling element operating portions 841 and 842 and are fixed thereto in a longitudinal direction. Thus, the assembling of the rolling element circulation unit 80 and the mounting thereof to the upper rail 60 are completed.

After the rolling element circulation units 80 have been assembled to the first and the second rolling element operating portions 841 and 842 of the pair of upper rails 60 at four portions, the pair of upper rails 60 are inserted into the pair of lower rails 50. Thus, the first and the second balls 821 and 822, portions of which are projecting from the first and the second window portions 811*e* and 812*e* are sandwiched between the first and the second operating surfaces 861 and 862 of the lower rail 50 and the first and the second operating surfaces 871 and 872 of the first and the second rolling element operating portions 841 and 842 of the upper rail 60. Under this structure, the first and the second balls 821 and 822 roll and circulate in a front-rearward direction of the upper rail 60 in the first and the second rolling element operating portions 841 and 842 and the recessed portions 45, keeping in contact with the first and the second operating surfaces 861 and 862 of the lower rail 50 and the first and the second operating surfaces 871 and 872 of the first and the second rolling element operating portions 841 and 842 provided on the upper rail 60, when the upper rail 60 relatively moves on the lower rail 50 in a front-rearward direction.

Thus, according to the vehicle seat slide device of the first and the second embodiments, the plurality of balls 42 or the first and the second balls 821 and 822 of the rolling element circulation unit 40 or 80 attached to the attaching portion 43 or 83 roll and circulate during a front-rearward movement of the upper rail 20 or 60 relative to the lower rail 10 or 50, always keeping in contact with the operating surface 47 or the first and the second operating surfaces 871 and 872 of the upper rail 20 or 60 and the operating surface 46 or the first and the second operating surfaces 861 and 862 of the lower rail 10 or 50 facing to the operating surface 47 or the first and the second operating surfaces 871 and 872. Accordingly, the play of upper rail 20 or 60 in up-down and right-left directions relative to the lower rail 10 or 50 can be eliminated. Particularly, in the first embodiment, the twelve balls 42 are sandwiched between the inclined surface shaped operating surface 47 having approximately 45 degrees inclination of the rolling element operating portion 44 and the circular surface shaped operating surface 46. The operating surface 47 is formed at four corner portions at up-down and right-left sides in cross section of the pair of upper rails 20 and the operating surface 46 is formed at four corner portions at up-down and right-left sides in cross section of the pair of lower rails 10. Accordingly, play in up-down and right-left directions of the upper rail 20 relative to the lower rail 10 can be eliminated.

Further, according to the first and the second embodiments, since the plurality of balls 42 or the first and the second balls 821 and 822 roll and circulate from the operating surface 47 or the first and the second operating surfaces 871 and 872 of the upper rail 20 or 60 to the non-operating surface side through the connecting regions for connecting the operating surface 47 or the first and the second operating surfaces 871 and 872 and the non-operating surface 47*a* or the first and the second f non-operating surface 871*a* and 872*a* formed at the reverse side of the operating surface 47 or the first and the second operating surfaces 871 and 872, the plurality of balls can make the upper rail 20 or 60 smoothly move along the lower rail 10 or 50 in a front-rearward direction. Particularly, in the first embodiment, by attaching the rolling element circulation unit 40 to the rolling element operating portion 44 formed between the two recessed portions 45, twelve (12) balls 42 can be smoothly rolled and circulated around the rolling element operating portion 44 through the recessed portions 45.

Further, in the first and the second embodiments, since the recessed portions 45 or 85 for holding the rolling element circulation unit 40 or 80 are provided at both sides of the rolling element operating portion 44 or the first and the second rolling element operating portions 841 and 842, the play of the rolling element circulation unit 40 or 80 can be prevented when the upper rail 20 or 60 is moved in a front-rearward direction along the lower rail 10 or 50 and the upper rail 20 or 60 can be smoothly moved in a front-rearward direction along the lower rail 10 or 50.

According to the first embodiment, since the twelve balls 42 are sandwiched between the grooves 41*c* and 41*d* of the first and the second cases 41*a* and 41*b*, which are mated mutually at each forming surface formed with the annular shaped grooves 41*c* and 41*d* and integrated together, labor hour for mounting the rolling element circulation unit 40 to the rolling element operating portion 44 can be greatly reduced and the assembling hour of the vehicle seat slide device can be greatly reduced.

Further, in the second embodiment, the first and the second rolling element operating portions 841 and 842 are formed by projecting in parallel with each other, and in the rolling element circulation unit 80 the first and the second fitting holes 811*h* and 812*h* and the first and the second fitting grooves 811*k* and 812*k* are provided as the fitting portions for receiving therein the first and the second rolling element operating portions 841 and 842. Thus, the rolling element circulation unit 80 can be attached to the first and the second rolling element operating portions 841 and 842 with a simple manner and accordingly, the assembling hour of the vehicle seat slide device can be largely reduced. Further, according to the second embodiment, since each ten (10) first and second balls 821 and 822 are disposed between the first and the second operating surfaces 871 and 872 of the first and the second rolling element operation portions 841 and 842 and the first and the second operating surfaces 861 and 862 formed with an inclined surface shape and roll in an orthogonal direction relative to the first and the second operating surfaces 871 and 872 of the parallel first and the second rolling element operating portions 841 and 842, the each ten (10) first and second balls 821 and 822 advance and retreat with an inclination relative to the first and the second operating surfaces 861 and 862. This can loosen up the contact degree of the rolling balls with the first and the second operating surfaces 861 and 862 to suppress occurrence of abnormal noise.

Further, according to the second embodiment, each ten (10) first and second balls 821 and 822 are sandwiched between the circular shaped first and the second operating surfaces 871 and 872 of the first and the second rolling element operating portions 841 and 842 formed at the two right and left portions in cross section of the pair of upper rails 60 and the inclined first and the second operating surfaces 861 and 862 having inclinations of about 45 degrees reversed with respect to each other formed at the four portions at up-down and right-left sides in cross section of the pair of lower rails 50 and accordingly, the play in up-down and right-left directions of the upper rail 60 relative to the lower rail 50 can be well eliminated.

In general, provision of individual annular grooves 811*c*, 811*d* and 812*c*, 812*d* or preparing of two rolling element circulation units is necessary for alternately rolling and circulating the first and the second balls 821 and 822 without mixing in the first and the second non-operating surfaces 871*a* and 872*a* side of the first and the second rolling element operating portions 841 and 842. However, according to the second embodiment, by providing the common grooves 813*c* and 813*d* and the partition wall portions 814*c* and 814*d*, forming individual grooves becomes unnecessary and providing only one rolling element circulation unit 80 is sufficient to achieve the operation. Thus, the space for providing the attaching portion 83 can be reduced and at the same time the number of parts for the rolling element circulation unit 80 can be reduced.

Further, according to the first or the second embodiment, by only inserting the rolling element operating portion 44 or the first and the second rolling element operating portions 841 and 842 of the upper rail 20 or 60 into the fitting hole 41h or the first and the second fitting holes 811h, 812h and the first and the second fitting grooves 811k and 812k penetrating through the inner portion or portions enclosed by the annular groove 41c or the first and the second grooves 811c, 811d and 812c, 812d, the rolling element circulation unit 40 or 80 can be attached to the rolling element operating portion 44 or the first and the second rolling element operating portions 841 and 842 of the upper rail 20 or 60. This can greatly reduce the assembling hour of the vehicle slide device. Further, since the elastically engaging detents 411 or 811 and the detent engaging portions 44a or 84a are formed at the fitting hole 41h or the first and the second fitting holes 811h and 812h and the rolling element operating portion 44 or the first and the second rolling element operating portions 841 and 842 for mutual elastic engagement, the rolling element circulation unit 40 or 80 is prevented from dropping off from the rolling element operating portion 44 or the first and the second rolling element operating portions 841 and 842 when the upper rail 20 or 60 moves along the lower rail 10 or 50.

Further, in the second embodiment, since the first and the second balls 821 and 822 roll gradually on the conic curve portions 811ca, 811da and 812ca, 812da, the contact degree of the balls with the first and the second operating surfaces 861 and 862 of the lower rail 50 during the first and the second balls 821 and 822 rolling from the non-operating surfaces 871a and 872a of the first and the second rolling element operating portions 841 and 842 to the first and the second operating surfaces 871 and 872 and rolling from the first and the second operating surfaces 871 and 872 to the first and the second non-operating surfaces 871a and 872a can be reduced thereby suppressing an occurrence of abnormal noise. And, since by just closing the second case 81b which is connected to the first case 81a, the first case 81a and the second case 81b can be easily fixed, the assembling hour of the rolling element circulation unit 80 can be largely reduced.

Further, in the first and the second embodiment, since the twelve (12) balls 42 or each ten (10) first and the second balls 821 and 822 are annularly arranged at the rolling element operating portion 44 or the first and the second rolling element operating portions 841 and 842 of the rail, the one which length is relatively shorter than the other, i.e., the upper rail 20 and 60, the vehicle slide device can be realized which is adjustably movable with a long adjusting stroke because it can make the lower rail 10 or 50 as long as possible.

According to the above first and the second embodiments, the balls 42 and the first and the second balls 821 and 822 are exampled as a rolling element, however, rollers may be used instead of the above. And, the number of balls 42 is set to be twelve (12) and the number of each of the first and the second balls 821 and 822 is set to be ten (10), but the number of balls is not limited to the above and the number of the balls can be appropriately set. Further, according to the first embodiment, the first and the second cases 41a and 41b are adhered to each other by adhesive agent, however, the cases may be fastened by screws or rivets. The cases can be structured to be connected with each other at one side so as to be freely openable and closable. Further, the outer peripheral portion of the grooves 41c and 41d at both ends thereof are formed with a semicircular shape, but as shown in the second embodiment, the shape may be a shape having a conic curve.

According to the second embodiment, the first and the second cases 81a and 81b are connected to each other at the engaging portion 81c for freely openable and closable. However, the first and the second cases 81a and 81b may be separately formed and glued to each other by adhesive agent, or fastened by screws or rivets. Further, the outer peripheral portions of the first and the second grooves 811c, 811d and 812c, 812d at both ends thereof are formed to be of a shape having a conic curve. However, the outer peripheral portions may be formed as a semicircular shape. Further, according to the first and the second embodiments, the rolling element circulation unit 40 or 80 is attached to the attaching portion 43 or 83 of the upper rail 20 or 60. However, the unit may be attached to the lower rail 10 or 50. In the embodiments explained, the vehicle slide device is adapted to the vehicle seat but can be adapted to any device as long as it is used for a vehicle.

Various features and many of the attendant advantages in the forgoing embodiment will be summarized as follows:

Since the plurality of rolling elements of the rolling element circulation unit attached to the attaching portion roll and move with being always in contact with the operating surface of the second rail and the surface of the first rail facing to the operating surface when the second rail moves relative to the first rail in a front-rearward directions, play of the second rail relative to the first rail in both up-down and right-left directions can be eliminated. Further, since the plurality of rolling elements roll and circulate from the operating surface of the second rail to the non-operating surface side through a region connecting the operating surface and the non-operating surface formed at the reverse side of the operating surface, the plurality of rolling elements can make the second rail smoothly move along the first rail in a front-rearward direction. Accordingly, a slide device is realized for a vehicle which can be adjustably movable with a long adjustable stroke.

The attaching portion is provided with a rolling element operating portion formed by a portion of a plate shaped portion formed at the second rail and facing to the first rail and a recessed portion provided at the both ends in a rail moving direction of the rolling element operating portion. Thus, by attaching the rolling element circulation unit to the rolling element operating portion formed between the two recessed portions, the plurality of rolling elements can roll and circulate smoothly around the rolling element operating portion through the recessed portions.

Since the operating surface of the attaching portion is formed with an inclined surface shape having a constant inclination facing to the corner portion of the first rail and the attaching portion is formed at plural portions of the second rail in cross-section, play of the second rail relative to the first rail in both up-down and right-left directions can be well eliminated.

The rolling element circulation unit attached to the rolling element operating portion is held by the recessed portions which are formed at both sides of the rolling element operating portion, and therefore, play of the rolling element circulation unit can be prevented when the second rail moves along the first rail in a front-rearward direction and the second rail can smoothly move along the first rail.

The rolling element circulation unit is formed by a case having a first case and a second case each being provided with an annular groove, in which the rolling elements roll and circulate, at each forming surface of the first and the second cases. The case being formed by bringing the first and the second cases contact with each other at the forming surfaces. Since the plurality of rolling elements are disposed in the grooves of the first and the second cases, the mounting work for mounting the rolling element circulation unit to the rolling element operating portion can be easily performed and the assembling hour of the slide device for the vehicle can be largely reduced.

The attaching portion is formed at the second rail by plate shaped portions facing to the first rail and includes a first and a second rolling element operating portions extending in parallel with each other in a longitudinal direction of the second rail. The rolling element circulation unit includes circulation passages, in which the rolling elements roll and circulate, at the first and the second rolling element operating portions, respectively and fitting portions provided at the inner portions enclosed by respective circulation passages for receiving the first and the second rolling element operating portions. Thus, the rolling element circulation unit can be attached to the first and the second rolling element operating portions with a simple manner and accordingly, the assembling hour of the slide device for the vehicle can be largely reduced.

The plurality of rolling elements are disposed between the operating surfaces of the first and the second rolling element operation portions and the first and the second surfaces formed at the first rail with the inclined surface shapes having constant inclinations reversed with respect to each other facing to the operating surfaces of the first and the second rolling element operating portions. Therefore, the plurality of rolling elements roll in an orthogonal direction relative to the operating surfaces of the parallel first and the second rolling element operating portions and advance and retreat with an inclination relative to the first and the second surfaces. This can decrease the contact degree of the rolling elements with the first and the second surfaces to suppress an occurrence of abnormal noise.

The attaching portion includes a recessed portions enclosing the both ends of the first and the second rolling element operating portions in a rail moving direction and the rolling element circulation unit attached to the first and the second rolling element operating portions is held by the recessed portion. Thus, play of the rolling element circulation unit can be prevented when the second rail moves along the first rail in a front-rearward direction and the second rail can smoothly move along the first rail.

The rolling element circulation unit includes a case formed by bringing a first case and a second case contact with each other at forming surfaces on which two annular grooves are respectively formed and the rolling elements roll and circulate at the first and the second rolling element operating portions in each of the two annular grooves, and each of the two annular grooves has a common groove and a partition wall portion for making the rolling elements capable of rolling and circulating alternately without mixing with each other at the non-operating surface side of the first and the second rolling element operating portions. Provision of individual annular grooves or preparing two rolling element circulation units is necessary for making the rolling elements to alternately roll and circulate without mixing at the non-operating surface side of the first and the second rolling element operating portions. However, by providing the common groove and the partition wall portion, forming of individual grooves becomes unnecessary and provision of one rolling element circulation unit is sufficient to achieve the operation. Thus, the space for providing the attaching portion can be reduced and at the same time the number of parts for the rolling element circulation unit can be reduced.

The first case is bored to form a fitting hole penetrating through the inner portion enclosed by the annular groove, the second case is provided with a fitting groove corresponding to the fitting hole and the rolling element circulation unit is attached to the rolling element operating portion by inserting the rolling element operating portion into the fitting hole and the fitting groove. Therefore, the rolling element circulation unit can be attached to the rolling element operating portion. This can enormously reduce the assembling hour of the slide device for a vehicle.

Since the elastically engaging portions which engage with each other by elastic deformation are formed at the fitting hole and the rolling element operating portion, the loosening of the rolling element circulation unit off from the rolling element operating portion can be prevented when the second rail moves along the first rail in a front-rearward direction.

The annular grooves are formed with an oval annular shape having conic curve portions and the plurality of rolling elements roll gradually in the conic curve portion, and therefore, the contact degree of the rolling elements with the first and the second surfaces can be loosened up to suppress occurrence of abnormal noise when the rolling elements roll from the non-operating surface to the operating surface of the first and the second rolling element operating portions and roll from the operating surface to the non-operating surface.

The first and the second cases are connected at one end side to be freely openable and closable and engaging portions are provided at the other end side of the first and the second cases for fixing the first and the second cases by closing. Thus, by just closing the second case which is connected to the first case, the first and the second cases can be easily fixed thereby largely reducing the assembling hour of the rolling element circulation unit.

The first rail is adapted to be fixed to a vehicle floor side and is longer than the second rail in lengthwise and the plurality of rolling elements are annularly arranged at the rolling element operating portion of the second rail. Therefore, the slide device for a vehicle can be realized which can be adjustably movable with a long adjusting stroke.

The first rail is the lower rail fixed to the vehicle floor, the second rail is the upper rail fixed to the seat of the vehicle and the rolling element circulation unit is attached to the attaching portion of the upper rail. Thus, it can be realized that the seat slide device for a vehicle can be adjustably movable with a long adjusting stroke, in which the upper rail is movable in a front-rearward direction smoothly along the lower rail without causing play therebetween.

INDUSTRIAL APPLICABILITY

The vehicle slide device according to the invention is adaptable for adjusting a vehicle seat position in a front-rearward direction, and more particularly, the invention is suitable for a case where smoothly adjusting a position of a vehicle seat is required.

The invention claimed is:
1. A slide device for a vehicle comprising:
a first rail;
a second rail supported on the first rail and relatively movable thereto;
an attaching portion formed at the second rail provided with an operating surface facing to the first rail, a non-operating surface formed at a reverse side of the operating surface and connecting regions for connecting the operating surface and the non-operating surface at both ends thereof; and
a rolling element circulation unit attached to the attaching portion and having a plurality of rolling elements rolling by contacting with the operating surface and a surface formed at the first rail and facing to the operating surface and at the same time rolling and circulating into contact with the non-operating surface via the connecting region, wherein the attaching portion is provided with a rolling element operating portion formed by a portion of a plate portion formed at the second rail and facing to the first rail and recessed portions provided at the both ends in a rail moving direction of the rolling element operating portion, and wherein the rolling element circulation unit attached to the rolling element operating portion is held by the recessed portions.

2. The slide device for a vehicle according to claim 1, wherein the operating surface of the attaching portion is formed with an inclined surface having a constant inclination facing to a corner portion of the first rail and wherein the attaching portion is formed at plural portions of the second rail in cross section.

3. The slide device for a vehicle according to claim 1, wherein the rolling element circulation unit is formed by a case having a first case and a second case each being provided with an annular groove, in which the rolling elements roll and circulate, at each forming surface of the first and the second cases, the case being formed by bringing the first and the second cases into contact with each other at the forming surfaces.

4. The slide device for a vehicle according to claim 3, wherein the first case is bored to form a fitting hole penetrating through an inner portion enclosed by the annular groove, the second case is provided with a fitting groove corresponding to the fitting hole and the rolling element circulation unit is attached to the rolling element operating portion by inserting the rolling element operating portion into the fitting hole and the fitting groove.

5. The slide device for a vehicle according to claim 4, wherein the fitting hole and the rolling element operating portion are formed with elastically engaging portions to engage with each other by elastic deformation.

6. The slide device for a vehicle according to claim 3, wherein the annular grooves are formed with an oval and annular shape having conic curve portions.

7. The slide device for a vehicle according to claim 3, wherein the first and the second cases are connected at one end side to be freely openable and closable and engaging portions are provided at the other end side of the first and the second cases for fixing the first and the second cases by closing.

8. The slide device for a vehicle according to claim 1, wherein the first rail is adapted to be fixed to a vehicle floor side and is longer than the second rail in lengthwise.

9. The slide device for a vehicle according to claim 1, wherein the first rail is a lower rail fixed to a vehicle floor, the second rail is an upper rail fixed to a vehicle seat and wherein the rolling element circulation unit is attached to the attaching portion of the upper rail.

* * * * *